United States Patent [19]
Shioya et al.

[11] Patent Number: 6,023,178
[45] Date of Patent: Feb. 8, 2000

[54] PULSE WIDTH CONTROL IC CIRCUIT AND SWITCHING POWER SUPPLY UNIT

[75] Inventors: Masaki Shioya; Hideaki Matsumura; Takumi Ooe; Iwao Nakanishi; Masuo Hanawaka, all of Tokyo, Japan

[73] Assignee: Yokogawa Electric Corporation, Tokyo, Japan

[21] Appl. No.: 09/050,583

[22] Filed: Mar. 30, 1998

[30] Foreign Application Priority Data

Apr. 9, 1997 [JP] Japan .................................. 9-090501
Jun. 27, 1997 [JP] Japan .................................. 9-171544

[51] Int. Cl.[7] .................................................. H03K 3/017
[52] U.S. Cl. .......................... 327/176; 327/177; 363/65; 363/123; 361/87; 361/90
[58] Field of Search ..................................... 327/172–177, 327/403, 404; 363/21, 65, 67, 20, 123, 134; 361/87, 90

[56] References Cited

U.S. PATENT DOCUMENTS 5,657,211 8/1997 Brockmann ............................... 363/16
5,796,596 8/1998 Williams ................................... 363/21

*Primary Examiner*—Kenneth B. Wells
*Assistant Examiner*—Minh Nguyen
*Attorney, Agent, or Firm*—Moonray Kojima

[57] ABSTRACT

A pulse width control IC circuit that greatly reduces price, increases packaging density, and improves reliability for switching power supply units, wherein the IC circuit is on a single chip and includes a main converter control section that controls the ON and OFF actions of a main switch outside the IC, an output MOSFET, and an auxiliary converter control section that controls the ON and OFF actions of the output MOSFET.

10 Claims, 6 Drawing Sheets

PULSE WIDTH CONTROL IC CIRCUIT AND SWITCHING POWER SUPPLY UNIT

BACKGROUND OF THE INVENTION

1. Field of Invention

This invention relates to a pulse width control IC circuit, used in electronic equipment, such as computers; and more particularly, to a pulse width modulation (PWM) IC and switching elements in an auxiliary power supply, and to a switching power supply unit using such auxiliary power supply, wherein the number of components on the primary side is reduced when the pulse width control IC circuit is incorporated therein.

2. Description of the Prior Art

As disclosed in Japan Unexamined UM Appl.1990/37592, the conventional switching power unit combines a main converter and an auxiliary converter. The main converter has an output voltage regulating circuit and the auxiliary converter has a simple circuit configuration, such as a ringing choke converter (RCC power supply). The capacity of the main converter is several hundred watts, while the capacity of the auxiliary convert is several watts.

However, even an auxiliary converter is an independent converter and thus requires switching elements and control elements, as well as a number of components equal to that of the main converter, even though such auxiliary converter consumes only a few watts. Accordingly, the ratio of cost of the primary circuit and the packaging area on the printed circuit board in the auxiliary converter to the cost of an entire power supply unit is great. In addition, since a high breakdown voltage is required for switching elements for the auxiliary converter, large package FETs and transistors having larger current ratings than were actually necessary were employed, thereby requiring countermeasures in order to reduce costs.

SUMMARY OF THE INVENTION

Accordingly, an object of the invention is to overcome the aforementioned and other deficiencies, disadvantages and problems of the prior art.

Another object is to provide a pulse width control IC circuit that greatly reduces the cost, increases the packaging density, and improves the reliability for switching power supply units.

A further object is to provide a low cost switching power supply unit having a high packaging density and high reliability by minimizing the packaging area on the printed circuit board by reducing the number of components in the primary circuit of the auxiliary converter.

The foregoing and other objects are attained by the invention which encompasses a pulse width control IC circuit which has the following components on a single chip: a main converter control section that controls turning ON and OFF of a main switch which is outside the IC, an output MOSFET, and an auxiliary converter control section that controls turning ON and OFF of the MOSFET.

The main converter control section controls driving of the main switch, for example, regulates the main switch output voltage regardless of the load current using a pulse width control system. The auxiliary converter control section drives the output MOSFET; for example, regulates the output voltage of the output MOSFET to a constant value using a pulse width control system. By utilizing efficient, and cost effective semiconductor manufacturing techniques, the main converter control section, auxiliary converter control section and the MOSFET are constructed on the single chip.

The foregoing and other objects are further attained by a switching power supply unit which comprises a main converter comprising a main switching element to turn ON and OFF a DC current supplied to a primary winding of a main transformer; a secondary rectifier circuit to rectify and smooth the ON-OFF signal induced in a secondary winding of the main transformer; an error amplifier to generate error voltage signals between a reference voltage and the main output voltage which is outputted by the secondary rectifier circuit; and a main converter control section to send ON-OFF signals to the main switching element so that the error voltage signal sent from the error amplifier is decreased; and and auxiliary converter comprising an auxiliary switching element to turn ON and OFF a DC current applied to a primary winding of an auxiliary transformer; a secondary rectifier circuit to rectify and smooth the ON-OFF signal induced in a secondary winding of the auxiliary transformer; a primary rectifier circuit to rectify and smooth the ON-OFF signal induced in a bias winding of the auxiliary transformer; and an auxiliary converter control section to send ON-OFF signals to the auxiliary switching element so that the voltage detected with the primary rectifier circuit is regulated to hold a predetermined reference voltage.

The converters use the IC circuit formed on a single chip and comprising the main converter control section, the auxiliary converter control section and the auxiliary switching element.

According to the invention, since the main converter control section, the auxiliary converter control section, and the auxiliary switching element are placed on the primary side of the power supply unit, their isolation from the secondary side is ensured even though they are constructed on the single chip. At the same time, the problem of heat dissipation does not occur although there is a one-chip configuration which includes the auxiliary switching element because the capacity of the auxiliary converter is far smaller than that of the main converter. Since the auxiliary converter control section which comprises many discrete components is constructed on a single chip, the area occupied by the components,e.g. when they are mounted on a printed circuit board, is very small. This enables a considerable reduction in cost of manufacture.

DETAILED DESCRIPTION OF THE PREFERRED EMBODIMENTS FIRST ILLUSTRATIVE EMBODIMENT

Figures 1, 1A:
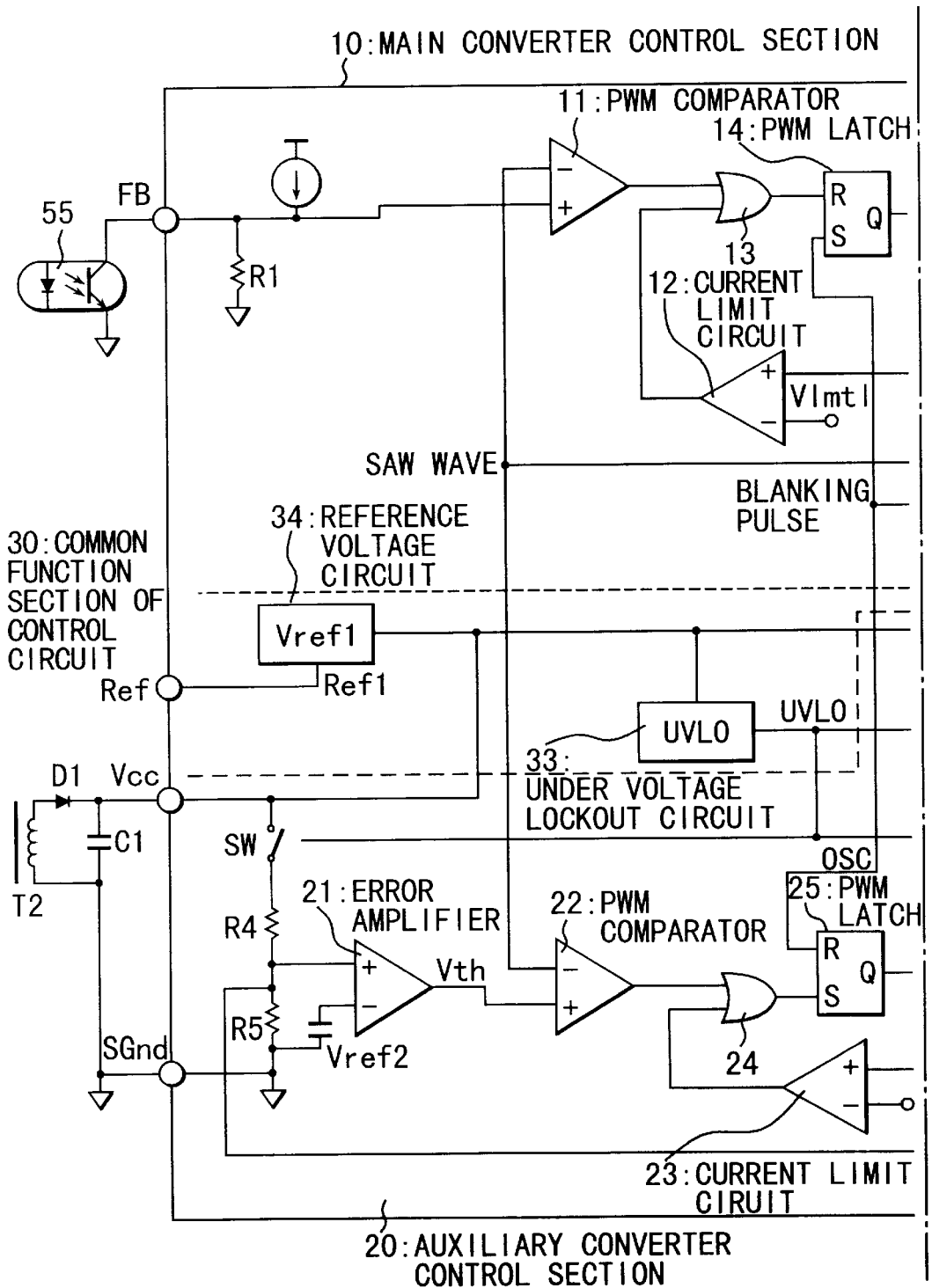
FIG. 1 comprising
FIGS. 1A and 1B are combined as a single circuit diagram depicting a first illustrative embodiment of the invention encompassing a pulse width congrol IC circuit.
Figure 1B:
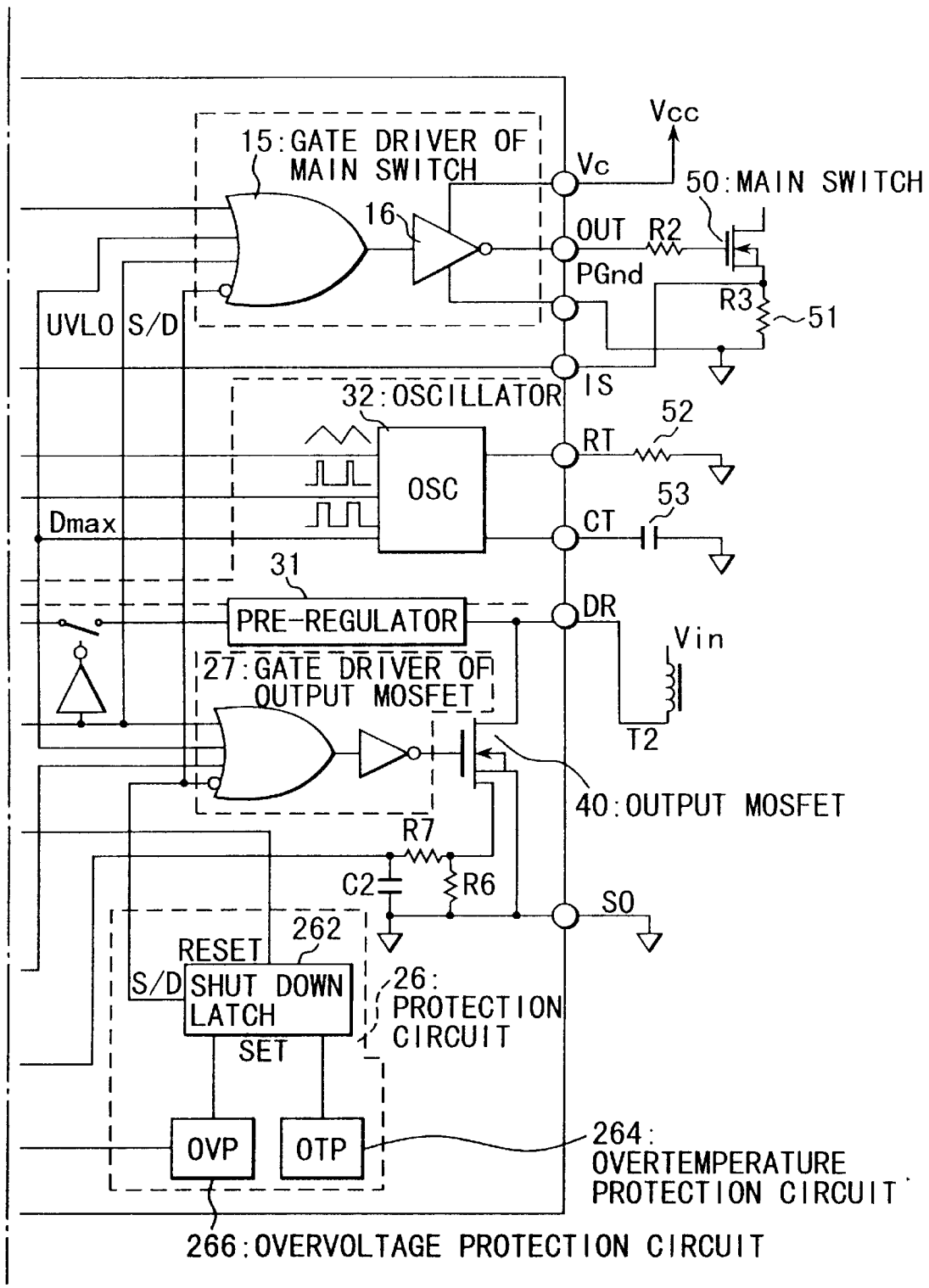

FIGS. 1A and 1B, are combined to form a single drawing showing a circuit diagram of the first illustrative embodiment of the invention encompassing a pulse width control IC circuit which comprises a main converter control section 10;

an auxiliary converter control section 20; a common function section 30; and an output MOSFET 40 (which may be considered to act as an auxiliary switching element). The IC circuit also has connected thereto as external components resistors R2,r3, and RT, a capacitor CT, a transformer T2, a photo-coupler 55,etc. In addition,an FET is included as a main switch 50, which also is outside of the IC.

The main converter control section 10 comprises a pulse width modulation (PWM) comparator 11; a current limit circuit 12; a PWM latch 14; and a gate driver 15 which drives the main switch 50. PWM comparator 11 compares the signal inputted to the IC feedback terminal FB with a sawtooth wave signal supplied by oscillator 32 and generates a pulse signal having a duty ratio corresponding to the FB terminal signal. The photo-coupler 55 is connected to the FB terminal of the IC and the feedback signal from an error amplifier located in the secondary of the main switch 50 is inputted to the photo-coupler 55. A pull up resistor R1 is connected between the FB terminal of the IC and the plus terminal of the PWM comparator 11, to provide a bias potential.

The current limit circuit 12 detects drain current Is with resistor R3 and turns OFF gate driver 15 until the next cycle by resetting PWM latch 14 when drain current Is exceeds the limit value $V_{LMT1}$ to thereby provide overcurrent protection. The OR gate 13 executes OR operation for the output signals from PWM comparator 11 and the current limit circuit 12 and sends the results to the gate driver 15. The output signal from the OR gate 13 is inputted to the reset terminal R of the PWM latch 14. The blanking pulse from the oscillator 32 is inputted to the set terminal S of the PWM latch 14. The output signal at the terminal Q of the PWM latch 14 is inputted to the gate driver 15.

The output voltage of the gate driver 15 has a high level (H) in synchronization with the blanking pulse of oscillator 32 and has a low level (L) when PWM comparator 11 resets PWM latch 14. Thus, the main switch 50 is controlled so that the on-duty becomes long when the FB terminal voltage drops. The inverter 16 drives the main switch 50 via resistor R2 from the OUT terminal thereof in response to the output signal from gate driver 15, and the driving power Vcc is supplied through the positive voltage terminal vc, and is grounded at ground terminal PGnd.

The auxiliary converter control section 20 comprises an error amplifier 21; a PWM comparator 22; a current limit circuit 23; a PWM latch 25; and a protection circuit 26. The positive power supply voltage Vcc is divided by divider resistors R4 and R5. The divided voltage is inputted to the plus terminal of the error amplifier 21 and compared with the reference power voltage Vref2 applied to the minus terminal of the error amplifier 21. The resulting error is amplified by error amplifier 21 whose output is then sent to the plus terminal of the PWM comparator 22 as a threshold voltage Vth. In the embodiment, a low stand-by current is obtained by disconnecting divider resistors R4 and R5 from the positive power voltage Vcc by opening a switch SW before start up using an under voltage lockout circuit 33.

The PWM comparator 22 compares the threshold voltage Vth with the saw tooth wave signal from oscillator 32 and generates pulse signals having a duty ratio corresponding to the threshold voltage Vth. The current limit circuit 23 provides over current protection when the drain current detected from the multisource of the MOSFET exceeds the maximum value limiting value $V_{LMT2}$, by resetting the PWM latch 25 and thus turning OFF the gate driver 27 until the next cycle. The OR gate 24 executes OR operation for the output signals from the PWM comparator 22 and from current limit circuit 23 and provides the results of the OR operation to the PWM latch 25. The output signal from the OR gate 24 is inputted to the reset terminal R of the PWM latch 25, and the blanking pulse from the oscillator 32 is inputted to the set terminal S of the PWM latch 25. The output signal from the terminal Q of the PWM latch 25 is inputted to the gate driver 27.

The protection circuit 26 comprises a shut down latch 262, an over temperature protection circuit 264, and an over voltage protection circuit 266. When an over voltage occurs in positive power voltage vcc,the over voltage protection circuit 266 sets shut down latch 262 to shut down both the gate driver 27 and the gate driver 15. In addition, when the chip junction temperature reaches a cut off temperature, the over temperature protection circuit shuts down both the gate driver 15 and the gate driver 27. The shut down latch 262 is reset when the positive power voltage Vcc decreases to a voltage equal to or less than the stop voltage.

The gate driver 27 drives output MOSFET 40 and turns ON the output MOSFET 40 when the blanking pulse from the oscillator 32 sets the PWM latch 25 and turns OFF the output MOSFET 40 when the PWM comparator 22 resets PWM latch 25. The blanking pulse from the oscillator 32 is in synchronism with the output pulse from the PWM comparator 22 and the output MOSFET 40 is controlled so that its on-duty becomes longer when the threshold voltage vth, outputted by error amplifier 21, is low.

The output MOSFET 40 is a power MOSFET used as a switching device, and is packaged on the same single chip as the control circuits and has a sufficiently high breakdown voltage that can be used for an AC input power. Its drain current can be detected using a multisource or on resistance. In this embodiment, the drain current is supplied to current limit circuit 23 using a multisource ground resistor R6 and a CR circuit comprising resistor R7 and capacitor C2.

The common function section 30 comprises a pre-regulator 31; an oscillator 32; an under voltage lockout circuit 33; and reference voltage circuit 34. The common function section 30 is disposed to be common to both the main converter control section 10 and the auxiliary converter control section 20. The pre-regulator 31 is so named because it supplies a current to capacitor Cl of the positive power voltage terminal Vcc from the drain terminal Dr when the IC is started or shut down, to control the positive power voltage Vcc to a constant value. Oscillator 32 generates the following three types of signals: (a) a blanking pulse, (b) a saw tooth wave, and (c) a pulse wave signal. The blanking pulse is used to set PWM latches 14 and 25. The saw tooth wave signal is used for the PWM comparators 11 and 22 to determine pulse width. The pulse wave signal is used to set the maximum on duty values in the gate drivers 15 and 27. These signal are synchronized and the frequency is determined by the resistance value of resistor 52 connected to terminal RT and the capacitance value of capacitor 53 connected to the terminal CT.

The under voltage lockout (UVLO) circuit 33 acts to prevent malfunctioning of the IC when the positive power voltage Vcc is low. In other words, the UVLO circuit 33 stops IC operation when the positive power voltage Vcc drops to a certain stop voltage or below and initializes all the statuses. When the positive power voltage Vcc recovers to a certain start voltage and above, the UVLO circuit disconnects the pre-regulator 31 from the positive power voltage Vcc and starts the IC operation. The reference voltage circuit 34 is a reference voltage gnerating circuit utilizing a band gap generally used for analog IC circuits.

The operation of the FIG. 1 (comprising FIGS. 1A and 1B) embodiment is as follows. The main converter control section 10 serves as a control circuit to regulate the output voltage of the PWM switching power supply unit that uses the main switch 50 as a switching element to a constant value. That is, the output voltage of the PWM switching power supply unit is inputted to the feedback terminal FB of the IC via the photo coupler 55. A pulse width signal having a duty ratio corresponding to this feedback voltage is supplied to the gate driver 15 through PWM comparator 11, OR gate 13 and PWM latch 14. The, the driving signal of the gate driver 15 causes switching of the main switch 50 via inverter 16.

To prevent over load, current limit circuit 12 detects the drain current of the main switch 50 and turns OFF the gate driver 15 via OR gate 13 and PWM latch 14. Also, when the over temperature protection (OTP) circuit 264 and/or over voltage protection (OVP) circuit 266 operates, the shut down signal S/D turns OFF the gate driver 15. Furthermore, when the positive power voltage Vcc is equal to or below a certain stop voltage, the under voltage lockout circuit 33 turns OFF the gate driver 15 and initializes all of the statuses.

The auxiliary converter control section 20 serves as a control circuit to regulate the output voltage of an auxiliary power supply that employs the output MOSFET 40 as a switching element, to a constant value. That is, the positive power voltage Vcc (that is the output voltage of the auxiliary power supply) is inputted to error amplifier 21 via switch SW and divider resistors R4 and R5. The pulse width signal, having a duty ratio correponding to the positive power voltage Vcc, is sent from PWM comparator 22 to the gate driver 27 through the OR gate 24 and the PWM latch 25. The driving signal from the gate driver 27 cause switching of the output MOSFET 40. The operations of the current limit circuit 23 for prevention of over load, the over temperature protection circuit 264, the over voltage protection circuit 266, and the under voltage lockout circuit 33, are the same as those described for the main converter control section 10.

According to the embodiment of FIG. 1 (comprising FIGS. 1A and 1B), the pulse width control IC circuit is of small size and of low cost because the main converter control section 10, which controls the ON-OFF action of the main switch 50, located outside the IC, the output MOSFET 40, and the auxiliary converter control section 20, which controls the ON-OFF action of the output MOSFET 40, are provided on a single chip. That is, the switching device of the auxiliary power supply and its control circuit previously required approximately fifteen or sixteen components, are integrated into the single chip. Thus, the invention eliminates need for a MOSFET having unnecessarily large current rating and size, as previously required in the prior art.

SECOND ILLUSTRATIVE EMBODIMENT

Figures 2, 2A:
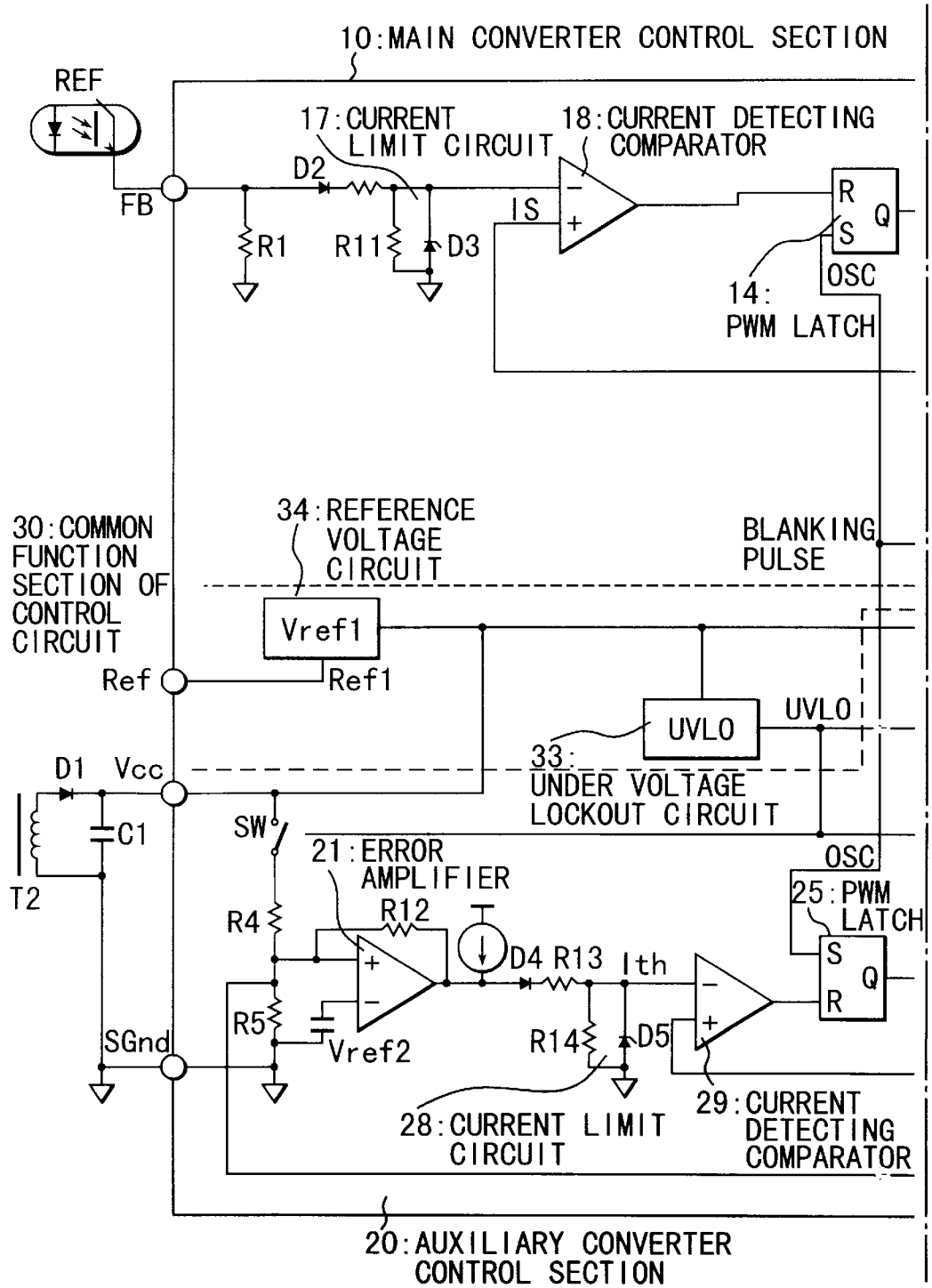
FIG. 2 comprising
FIGS. 2A and 2B are combined as a single circuit diagram depicting a second illustrative embodiment of the invention and encompassing a pulse width control IC circuit.
Figure 2B:
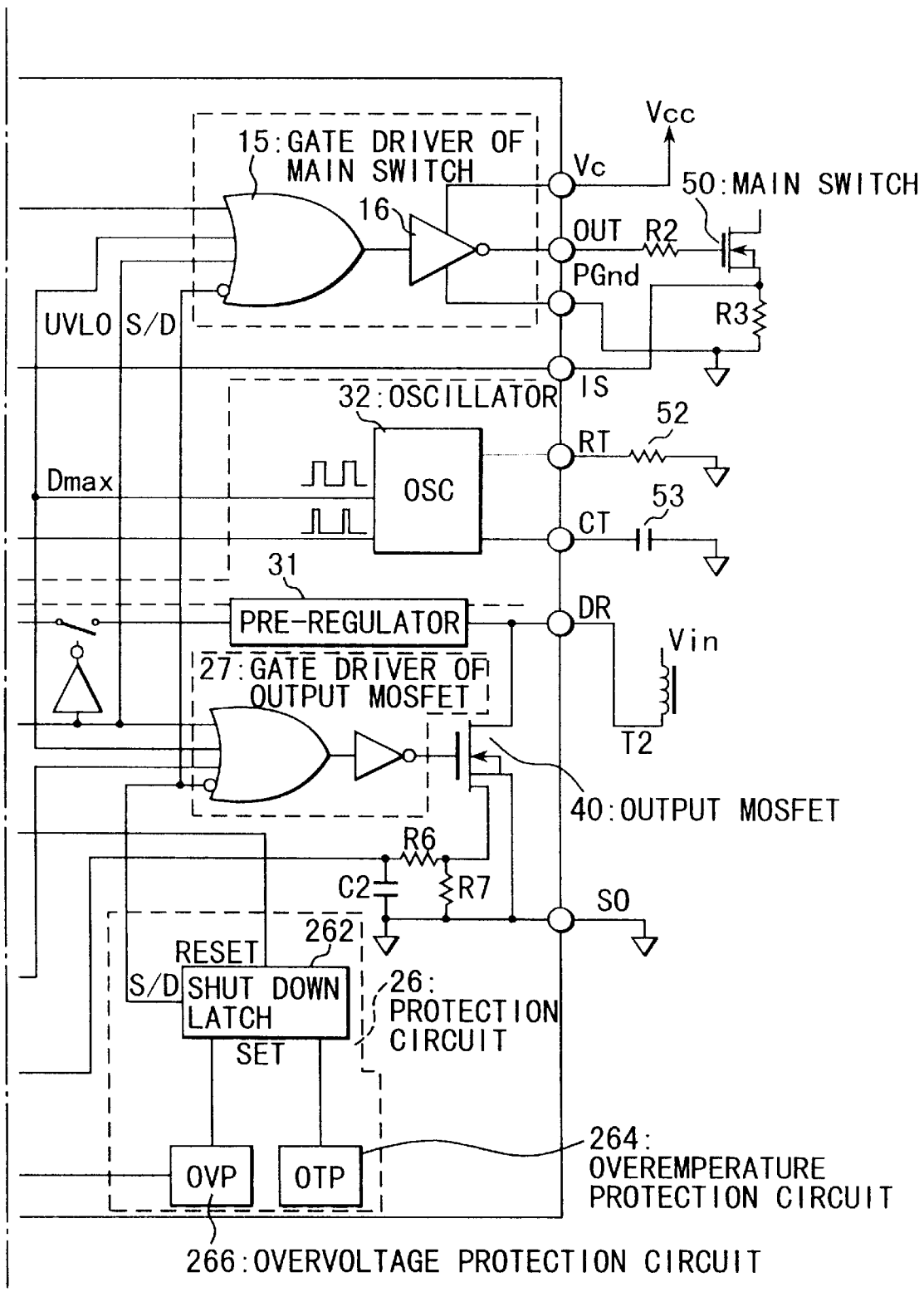

FIGS. 2A and 2B are combined (as FIG. 1) to show a single circuit diagram of the second illustrative embodiment encompassing a pulse width control IC circuit wherein current control method is used in the control circuit. In oscillator 32, the following points are common to the embodiment of FIG. 1: having blanking pulse signal to set the PWM latches 14 and 25, and generating pulse wave signals to set the maximum on duty time of the gate driver 15 (used to drive the main switch 50) and the gate driver 27 (used to drive the output MOSFET). However, the saw tooth wave signal generated by oscillator 32 are not generated in the embodiment of FIG. 2.

Hence, in main converter control circuit 10, the PWM latch 14 and the gate driver 15 are the same as in the embodiment of FIG. 1, but the current limit circuit 17 and the current detecting comparator 18 are provided, and the PWM comparator 11 is not present in the embodiment of FIG. 2. The current limit circuit 17 grounds a signal from the feedback terminal FB of the IC through the diode D2 and the divider resistors R10 and R11 and Zener diode D3 is provided in parallel with resistor R11. A signal from the Zener diode D3 is supplied to the minus terminal of the current detecting comparator 18 and the drain current from the main switch 50 is supplied from terminal Is to the plus terminal of the comparator 18.

In auxiliary converter control section 20, the error amplifier 21, the PWM latch 25, and the protection circuit 26 are the same as the embodiment of FIG. 1, and the current limit circuit 28 and the current detecting comparator 29 are different. In the error amplifier 21, a feedback resistor 12 is provided connecting the output terminal thereof to the plus terminal thereof in addition to the divider resistors R4 and R5 shown in the embodiment of FIG.1. The error amplified signal is outputted as the threshold current Ith. The current limit circuit 28 grounds the output signal from the output terminal of the error amplifier 21 through the diode D4 and the divider resistors R13 and R14. The Zener diode D5 is provided in parallel with resistor R14. The theshold current Ith from the Zener diode D4 is supplied to the plus terminal of the current detecting comparator 29 and the drain current detected from the multisource of the output MOSFET is fed back to the minus terminal of comparator 29.

The operation of the embodiment of FIG. 2 is as follows. The output voltage of the gate driver 15 has a high level (H) in synchronism with the blanking pulse from the oscillator 32, and a low level (L) when the drain current reaches the commanded value from the feedback terminal FB and the current detecting comparator 18 resets the PWM latch 14. In the embodiment, the over current protection is provided by limiting the maximum drain current from the main switch 50 by limiting the inverted input terminal voltage from the current detecting comparator 18 through the operation of the current limit circuit 17.

The output MOSFET 40 is turned ON in synchronism with the blanking pulses from the oscillator 32 and is turned OFF when the current detecting comparator 29 resets the PWM latch 25 after the drain current reaches the value of the threshold current Ith. In other words, the output MOSFET 40 is controlled to be turned ON only during the period when the drain current reaches the threshold current Ith obtained by amplifying the difference between the positive power voltage Vcc and the reference voltage Vref2 with the error amplifier.

In this embodiment, the over current protection is provided by limiting the maximum drain current from the output MOSFET 40 by limiting the inverted input terminal voltagae of the current detecting comparator 29 using the Zener diode D5 of the current limit circuit 28.

FIG. 2 shows only one embodiment of the pulse width control IC circuit. Normally used functions for the pulse width control circuit may be added or functions provided for the embodiment may be deleted. For example, a timer latch circuit may be added that operates when the over current flows in the main switch 50, or RT and CT terminals may be deleted to fix the frequency of the oscillator 32.

According to the invention, the following effect exists in addition to the above discussed effects. Since the current control method provides a control system of the first order lag, a very stable control system is obtained when constructing specifically a control circuit for the output MOSFET. This improves the reliability of the device because the following components are provided on a single chip: the current control type main converter control section for controlling the ON-OFF action of the main switch 50 outside the IC; the output MOSFET 40; and the current control type auxiliary converter control section 20 to control the ON-OFF action of the output MOSFET 40.

THIRD ILLUSTRATIVE EMBODIMENT

Figure 3:
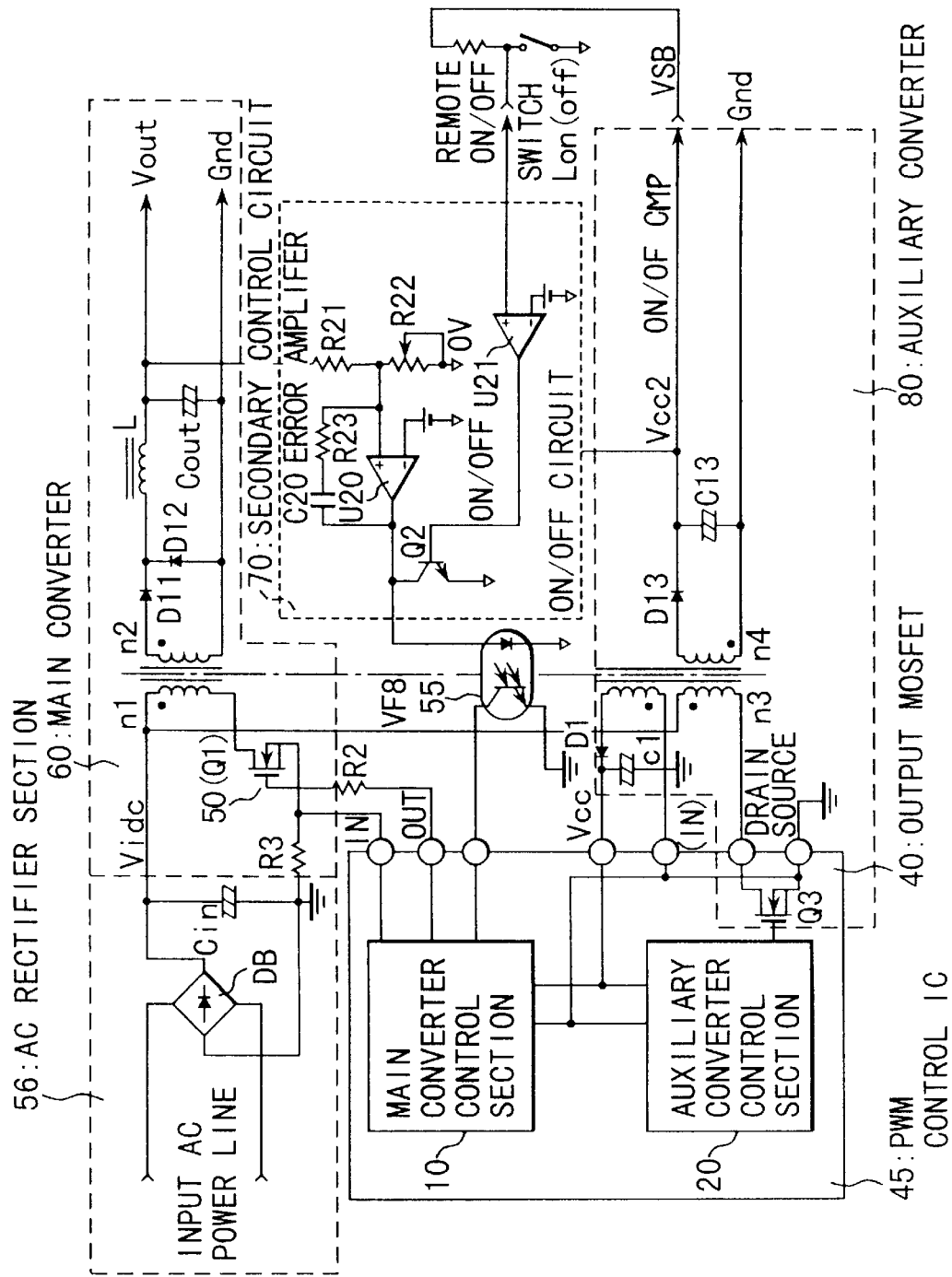
FIG. 3 is a circuit diagram depicting a still further illustrative embodiment of the invention and encompassing a switching power supply unit.

FIG. 3 shows a switching power supply unit, wherein AC rectifier section 56 receives line AC current supplied from an input AC power line using diode bridge DB, smoothes the rectified current with capacitor Cin, and supplies a DC current to the main converter 60 and auxiliary converter 80.

The main converter 60 comprises a main switching element 50 (Q1) that turns ON and OFF the DC current applied to the primary winding n1 of the main transformer. For example, main switching element 50 may be a MOSFET with the drain terminal thereof connected to the primary winding n1, and the source terminal thereof grounded at the primary ground through resistor R3. Resistor R3 generates a signal proportional to the load current and is connected to the current detecting terminal IN of the main converter control section 10. Connected to the secondary winding n2 of the main transformer is the secondary rectifier circuit comprising diodes D11 and D12, choke coil L, and output capacitor Cout. Since an ON-OFF signal is induced in the secondary winding n2, it is rectified and smoothed with the secondary rectifier circuit and the resulting main output voltage Vout is supplied to a load.

The secondary control circuit 70 applies the main output voltage Vout to the plus terminal of the error amplifier U20 after the voltage is divided with divider resistors r21 and R22. The error amplifier U20 compares the voltage with the first reference voltage Vref21 supplied to the minus terminal thereof, and outputs the error signal E/A OUT from the output terminal thereof. The error amplifier U20 is operated by providing feedback capacitor C20 and and resistor R23 between the minus terminal and output terminal thereof. The ON/OFF circuit inputs a signal from the remote ON/OFF circuit provided at the secondary side to the plus terminal of the comparator U21. The comparator U21 compares the input signal from the remote ON/OFF circuit with a second reference voltage Vref22 supplied to the minus terminal thereof, and supplies power ON/OFF signal P-ON/OFF to transistor Q2. The collector terminal of the transistor Q2 is connected to the output terminal of the error amplifier U20; the emitter terminal thereof is grounded; and the power ON/OFF signal is applied to the base terminal thereof. The photo coupler (PC) 55 provides isolation of the primary side from the secondary side when the error signal E/A OUT is applied to an LED and the light receiving transistor inputs the transmitted signal to the feedback terminal FB of the main converter control section 10.

The auxiliary converter 80 comprises an auxiliary switching element (Q3) 40 that turns ON and OFF DC current applied to the primary winding n3 of the auxiliary transformer. The secondary rectifier circuit, comprising diode D13 and capacitor C13, supplies auxiliary power voltage Vcc2 by rectifying and smoothing the ON/OFF signal induced in the secondary winding n4 of the auxiliary transformer. The auxiliary power voltage Vcc2 is used for the power supply for operation of the secondary control circuit 70 and is also supplied to the remote ON/OFF circuit as a slave output voltage $V_{SB}$. The primary rectifier circuit, comprising diode D1 and capacitor C1, supplies the auxiliary power voltage vcc by rectifying and smoothing the ON/OFF signal induced in the bias winding n5 of the auxiliary transformer.

The PWM control IC 45 comprises the main converter control section 10, the auxiliary converter control section 20 and the auxiliary switching element (Q3) 40 all integrated on a single chip. These components may comprise the elements shown in the embodiments of FIGS. 1 and 2. The auxiliary converter control section 20 supplies the ON/OFF control signal to the auxiliary switching element 40 so that the auxiliary power voltage Vcc detected by the primary rectifier circuit is regulated to a predetermined reference voltage. The source terminal of the auxiliary switching element 40 is grounded and the drain terminal thereof is connected to the primary winding n3. When the frequency oscillator is preferably made common to both the main converter control section 10 and the auxiliary converter control section 20, separation of the switching frequency in the main converter 60 and the auxiliary converter 80 is eliminated. Thus, it is relatively easy to provide countermeasures against noise.

The operation of the power supply unit of FIG. 3 is discussed with reference to the waveform chart of FIG. 4, wherein line (A) shows the output DC voltage Vidc of the AC rectifier section 56; line (B) shows the auxiliary power output voltage Vcc of the bias winding n5; line (C) shows the slave output voltage $V_{SB}$ of the auxiliary converter; line (D) shows the gate voltage signal of the auxiliary switching element, otherwise also shown as output MOSFET, 40; line (E) shows the voltage at the feedback terminal FB of the main converter control section 10; line (F) shows the voltage at the output terminal OUT of the main converter control section 10; line (G) shows the main converter output voltage Vout; and line (H) shows the signal of the remote ON/OFF circuit.

Figure 4:
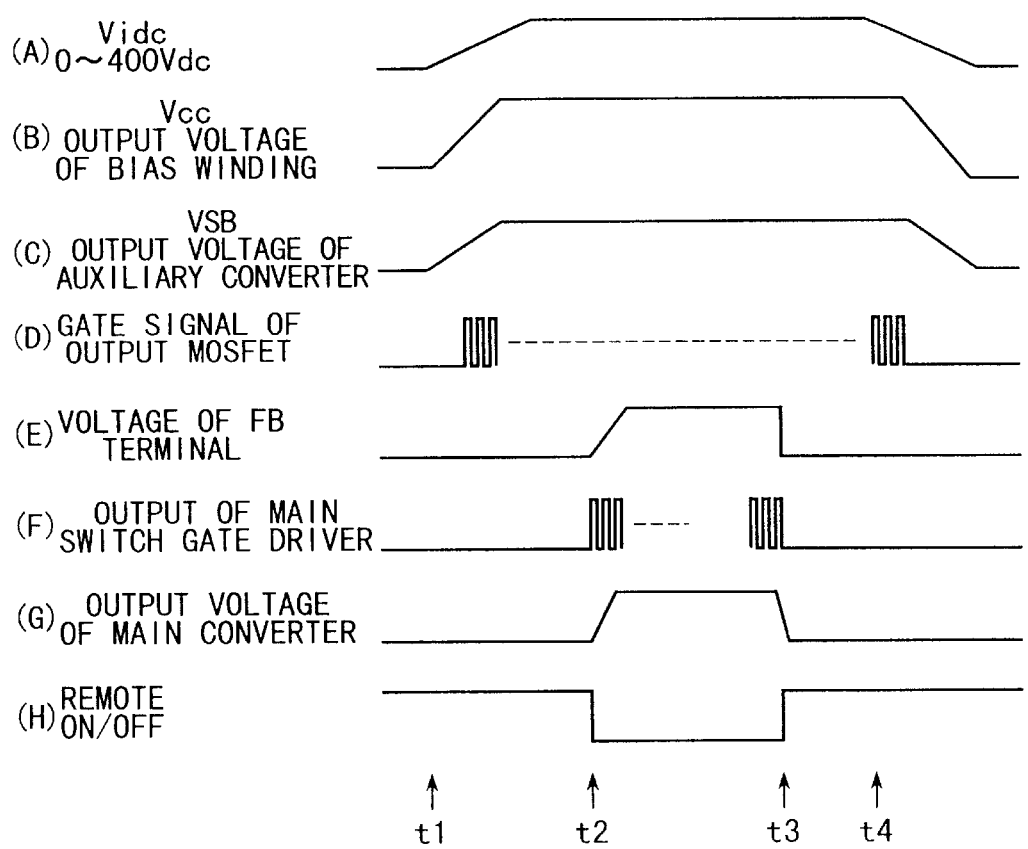
FIG. 4 comprising lines (A)–(H) are waveform diagrams depicting operation of the embodiment of FIG. 3.

In FIG. 4, the AC power from a line is inputted at instant t1 and the output DC voltage Vidc of the aCT rectifier section 56 rises. Then, the auxiliary converter control section 20 and the auxiliary switching element 40 of the PWM control IC 45 start to operate and the auxiliary power voltage Vcc, obtained by rectifying and smoothing the output of the bias winding n5 with diode D1 and capacitor C1, rises. The auxiliary power voltage Vcc is held at a constant voltage value by subjecting the auxiliary switching element 40 to pulse width control by auxiliary converter control section 20. The slave output voltage $V_{SB}$ of the auxiliary converter 80 also rises at the same time and is controlled to a voltage value obtained by multiplying the auxiliary power voltage Vcc by the turns ratio n4:n5 of the auxiliary tranformer. In addition, the auxiliary converter 80 continues to operate until the aC power line stops supplying voltage at instant t4.

When the remote ON/OFF circuit is turned ON at instant t2, the output of the comparator U21 has a low level (L) and the transistor Q2, which has been shorting the output of the error amplifier U20 to ground (GND), is turned OFF. The error amplifier U20 compares the divided value of the main output voltage Vout with the first reference voltage Vref21 and amplifies the error therebetween. The error amplified signal is then transmitted to feedback terminal FB of the main converter control section 10 in the PWM control IC 45 via the photo coupler PC. Then, the main converter control section 10 allows the main switching element Q1 to perform ON/OFF action to regulate the main output voltage Vout to a constant value.

At instant t3, the remote ON/OFF circuit is turned OFF. Then, since the output of the error amplifier U20 is shorted to 0 V, the error amplified signal is not fed back to the feedback terminal FB of the main converter control section 10 and the main converter stops operation. At instant t4, when the AC power from the line is stopped from being applied, the auxiliary converter 80 also stops operating.

In the FIG. 3 embodiment, only a minimum number of necessary terminals of the PWM control IC 45 are shown. However, it is also possible to construct a high breakdown voltage PWM control Ic having more functions by providing a terminal to output a reference voltage, a terminal to variably set the oscillation frequency, etc.

Advantageously, the invention results in reduction of the price of the primary circuits of the auxiliary converter and reduction in the packaging area on a printed circuit board, due to the integration on a single chip of the main converter control section, the auxiliary converter control section and the auxiliary switching element. In addition, an element whose rating matches the auxiliry switching can be integrated for use as the auxiliary switching element. This reduces the price of the auxiliary switching element as compared with the priorly used standard elements.

The foregoing description is illustrative of the principles of the invention. Numerous extensions and modifications thereof would be apparent to the worker skilled in the art. All such extensions and modifications are to be construed to be within the spirit and scope of the invention.

What is claimed is:

1. A pulse width control IC circuit comprising on a single chip:
 a main converter control section (10) that controls turning ON and OFF a main switch (50) outside the IC;
 an output MOSFET (40); and
 an auxiliary converter control IC section (2) that controls turning ON and OFF said output MOSFET;
 wherein said main converter control section comprises:
  a PWM comparator (11) that compares a signal inputted to a feedback terminal of said IC with a saw-tooth signal and generates a pulse signal having a duty ratio corresponding to said signal at said feedback terminal; and
  a gate driver (15) of said main switch that receives said pulse signal from said PWM comparator and implements control so that on-duty time becomes longer as a feedback terminal voltage decreases;
  wherein said gate driver of said main switch turns ON and OFF said main switch outside the IC, then an output voltage of said main switch is fed back as a feedbak termnial signal.

2. The circuit of claim 1, wherein said main converter control section comprises:
 a current limit circuit (12) that performs over-current protection by detecting load current of said main switch outside the IC, and when said load current exceeds a predetermined value, turns OFF said gate driver of said main switch.

3. The circuit of claim 2, wherein said main converter control section comprises:
 an OR gate (13) that takes a logical sum of output signal of said PWM comparator and output signal of said current limit circuit; and
 a PWM latch (14) that receives output signal of said OR gate at its reset terminal, receives blanking pulses sent from an oscillator (32) at its set terminal, and outputs a signal at its Q output terminal to said gate driver of said main switch.

4. A pulse width control IC circuit comprising on a single chip:
 a main converter control section (10) that control turning ON and OFF a main switch (50) outside the IC;
 an output MOSFET(40); and
 an auxiliary converter control IC section (20) that controls turning ON and OFF said output MOSFET:
 wherein said auxiliary converter control section comprises:
  an error amplifier (21) that compares auxiliary power voltage with a predetermined reference voltage and generates an error signal;
  a PWM comparator (22) that compares error amplified signal outputted from said error amplifier with a saw-toothed wave signal and generates a pulse signal having duty ratio corresponding to said error amplified signal; and
  a gate driver of said output MOSFET that receives pulse signal from said PWM comparator and implements control so that on duty time becomes longer as auxiliary pwoer voltage decreases; and wherein
  said gate driver of said output MOSFET turns ON and OFF said output MOSFET, and then output of said output MOSFET is fed back as said auxiliary power voltage.

5. The circuit of claim 4, wherein said auxiliary converter control section comprises:
 a current limit circuit (23) that performs over current protection by detecting load current of said output MOSFET and when said load current exceeds a predetermined limit value turns OFF said gate driver of said output MOSFET.

6. The circuit of claim 5, wherein said auxiliary converter control section comprises:
 an OR gate (24) that takes logical sum of output signal of said PWM comparator and output signal of said current limit circuit; and
 a PWM latch (25) that receives output signal of said OR gate at its reset terminal, receives blanking pulses sent from an oscillator (32) at its set termnial, and outputs at its Q output terminal a signal to said gate driver of said output MOSFET.

7. A pulse width control IC circuit comprising on a single chip:
 a current control type main converter control section (10) that controls turning ON and OFF a main switch (50) outside said IC;
 an output MOSFET(40); and
 a current control type auxiliary converter control IC section (20) that controls turning ON and OFF said output MOSFET;
 wherein said main converter control section comprises:
  a current detecting comparator (8) that compares an output voltage signal of said main switch inputted to a feedback terminal of said IC with a load current signal of said main switch and judges whether the load current signal reaches a commanded value of said output voltage signal at the feedback terminal (FB); and
  a gate driver (15) of said main switch that receives a pulse signal from said current detecting comparator and implements control so the on duty time becomes longer as output voltage signal decreases; and
  wherein said gate driver of said main switch turns ON and OFF the main switch outside the IC.

8. The circuit of claim 7, wherein said main converter control section comprises:
   a current limit circuit (17) that limits maximum value of said output voltage signal to a predetermined value, and limits maximum value of drain current of said main switch.

9. A pulse width control IC circuit comprising on a single chip:
   a current control type main converter control section (10) that controls turning ON and OFF a main switch (5) outside said IC;
   an output MOSFET (40); and
   a current control type auxiliary converter control IC section (20) that controls turning ON and OFF said output MOSFET;
   wherein said auxiliary converter control section comprises:
      an error amplifier (21) that compares auxiliary power voltage with a predetermined reference voltage and generates an error amplified signal;
      a current detecting comparator (29) that compares said error amplified signal outputted from said error amplifier with a load current signal of said output MOSFET and judges whether the load current signal reaches a commanded value of output voltage signal at the feedback terminal; and
      a gate driver (27) of said output MOSFET which implements control so that on duty time becomes longer as auxiliary power voltage decreases; and wherein
   the gate driver of said output MOSFET turns ON and OFF said output MOSFET, then said load current signal of said output MOSFET is fed back as said auxiliary power voltage.

10. The circuit of claim 9, wherein said auxiliary converter control section comprises:
   a current limit circuit (28) that limits maximum value of the error amplified signal applied to said current limiting comparator to a predetermined value, and limits maximum value of drain current of said output MOSFET.

* * * * *